United States Patent [19]

Kondo

[11] Patent Number: 5,065,232

[45] Date of Patent: Nov. 12, 1991

[54] ELECTRONIC STILL CAMERA SYSTEM

[75] Inventor: Makoto Kondo, Kanagawa, Japan

[73] Assignee: Canon Kabushiki Kaisha, Tokyo, Japan

[21] Appl. No.: 409,615

[22] Filed: Sep. 19, 1989

[30] Foreign Application Priority Data

Sep. 22, 1988 [JP] Japan .................... 63-236323
Sep. 22, 1988 [JP] Japan .................... 63-236324

[51] Int. Cl.$^5$ .................... H04N 9/73; H04N 9/04
[52] U.S. Cl. .................... 358/29 C; 358/41;
358/909; 358/906; 354/430; 354/145.1
[58] Field of Search .................... 358/41, 29 C, 29 R,
358/909, 906; 354/145.1, 127.1, 430, 149.11

[56] References Cited

U.S. PATENT DOCUMENTS

| 4,485,336 | 11/1984 | Yoshiyama et al. | 358/29 C |
| 4,827,332 | 5/1989 | Miyake et al. | 358/29 C |
| 4,847,680 | 7/1989 | Okino | 358/41 |
| 4,918,519 | 4/1990 | Suzuki et al. | 358/41 |
| 5,001,552 | 3/1991 | Okino | 358/41 |

Primary Examiner—James J. Groody
Assistant Examiner—Michael H. Lee
Attorney, Agent, or Firm—Robin, Blecker, Daley & Driscoll

[57] ABSTRACT

An electronic still camera system comprising a flash device holding information of a color temperature inherent in the flash light and an electronic still camera having a reading circuit for reading in the color temperature information and operating in such a manner that when the flash device is in use, the white balance of the video signal for a shot picture is adjusted in accordance with the read color temperature information.

30 Claims, 12 Drawing Sheets

ELECTRONIC STILL CAMERA SYSTEM

BACKGROUND OF THE INVENTION

1. Field of the Invention

This invention relates to an electronic still camera system.

2. Description of the Related Art

In the electronic still camera system, as the white balance control at the time of emission of flash light, there have been known an arrangement in which, when flash light is emitted, the white balance is set to a daylight color almost equivalent to the color temperature of the flash device (strobe), another arrangement in which, when flash is in use and when the ambient light is dark, the white balance is set to the daylight color, and still another arrangement in which, the white balance is determined by the guide number, the object distance, the measured value of available light and the colorimetric value.

In the conventional example, even if a plurality of types of flash devices are attachable for use, the white balance control at the time of using flash is limited to one method. This is because, in the case of flash photography, as the illuminating state, before an exposure, of an object to be photographed differs from the illuminating state of the object at the time of the exposure (when flash light is being cast), the usual white balance (the external light type, the TTL type, etc.) cannot be practiced.

In a case where a plurality of types of flash devices is usable, however, the color temperature differs with different types of the used flash device and, even in the same type, with different characteristics, and further, when the light-amount controllable flash device is in use, with different firing periods of time. Nonetheless it has been the prior art trend not to take this point into consideration at all.

SUMMARY OF THE INVENTION

It is, therefore, an object of the invention to provide an electronic still camera system in which as a plurality of flash devices are selectively used, color adjustment is performed to suit individually to any one of the flash devices.

Another object is to provide an electronic still camera which realizes an adequate white balance by taking into account the change of the color temperature with the firing period of time of the flash device.

To achieve such objects, according to the invention, in an embodiment thereof, an electronic still camera system includes a flash device holding information representing a color temperature inherent in its flash light and reading means for reading in the color temperature information, being characterized in that when the flash device operates, the color temperature information is read in to be used for adjustment of the white balance of video signals for the shot picture.

Thus, the flash device itself is made to store the information representing the color temperature inherent in of its flash light to be emitted, so that when the flash light is emitting, white balance is adjusted by using that information. Hence, the system can get the white balance suited to the individual one of the flash devices.

In another embodiment of the invention, an electronic still camera is characterized by correcting the white balance at the time of a flash exposure according to the flash light emitting period of time.

Hence, in correcting the white balance, a more reliable correction for the given photographic situation and more accurate control can be realized by the use of the information of the period of time for which the flash light is emitted.

Other objects and features of the invention will become apparent from the following description and the drawings.

DETAILED DESCRIPTION OF THE PREFERRED EMBODIMENTS

Figure 1:
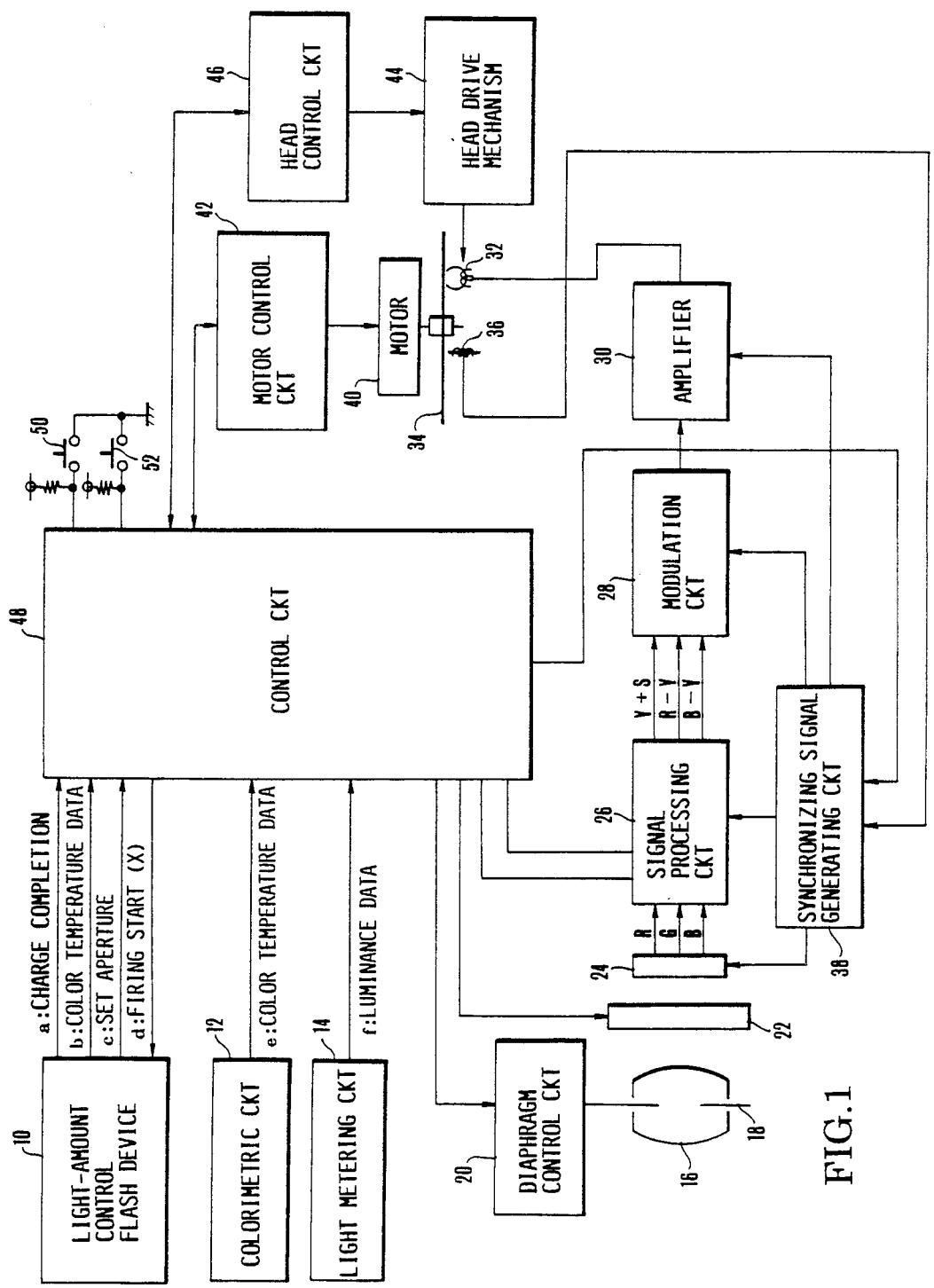
FIG. 1 is a block diagram of the construction of an embodiment of the invention.

FIG. 1 in block diagram shows one embodiment of the invention. Reference numeral 10 denotes a so-called light-amount controllable type flash device having a photosensitive element and in which the amount of reflected light from an object to be photographed is measured and when it becomes equivalent to an adequate exposure depending on the set value of diaphragm aperture and the sensitivity of an image sensor, the firing is stopped. An electronic still camera includes a colorimetric circuit 12 for measuring the color temperature of light with which the object is illuminated, a light metering circuit 14 for measuring the luminance of the object, a photographic optical system 16, a diaphragm 18, a diaphragm control circuit 20 for adjusting the size of aperture opening of the diaphragm 18 to a designated value, a shutter device 22, an image sensor 24 such as a CCD, a signal processing circuit 26 in which the output of the image sensor 24 is sampled and held, corrected in color temperature and gamma, and subjected to other treatments, a modulation circuit 28 for FM modulating the output of the signal processing circuit 26, a recording amplifier 30, a magnetic head 32, a PG coil 36 for detecting the phase of rotation of a still video floppy disk 34, and a synchronizing signal generating circuit 38 responsive to the signal for the phase of rotation from the PG coil 36 for producing a transfer clock and sampling and holding pulses which are applied to the image sensor 24, clamping pulses and synchronizing signals which are applied to the signal processing circuit 26, a carrier which is applied to the modulation circuit 28, and a record gating signal which is applied to the recording amplifier 30.

Reference numeral 40 denotes a spindle motor for rotating the floppy disk 34 with a control circuit 42 therefor. A head drive mechanism 44 moves the magnetic head 32 and carries out loading and unloading of the head 32. A head control circuit 46 controls the head drive mechanism 44. A control circuit 48 controls the operation and coordination of the illustrated various portions in accordance with the inputs from the external members such as the light meter and colorimeter. Switches 50 and 52 are interlocked with a release button (not shown) so that the switch 50 is turned on by a first stroke of the release button, and the switch 52 is turned on by a second stroke.

Figure 2:
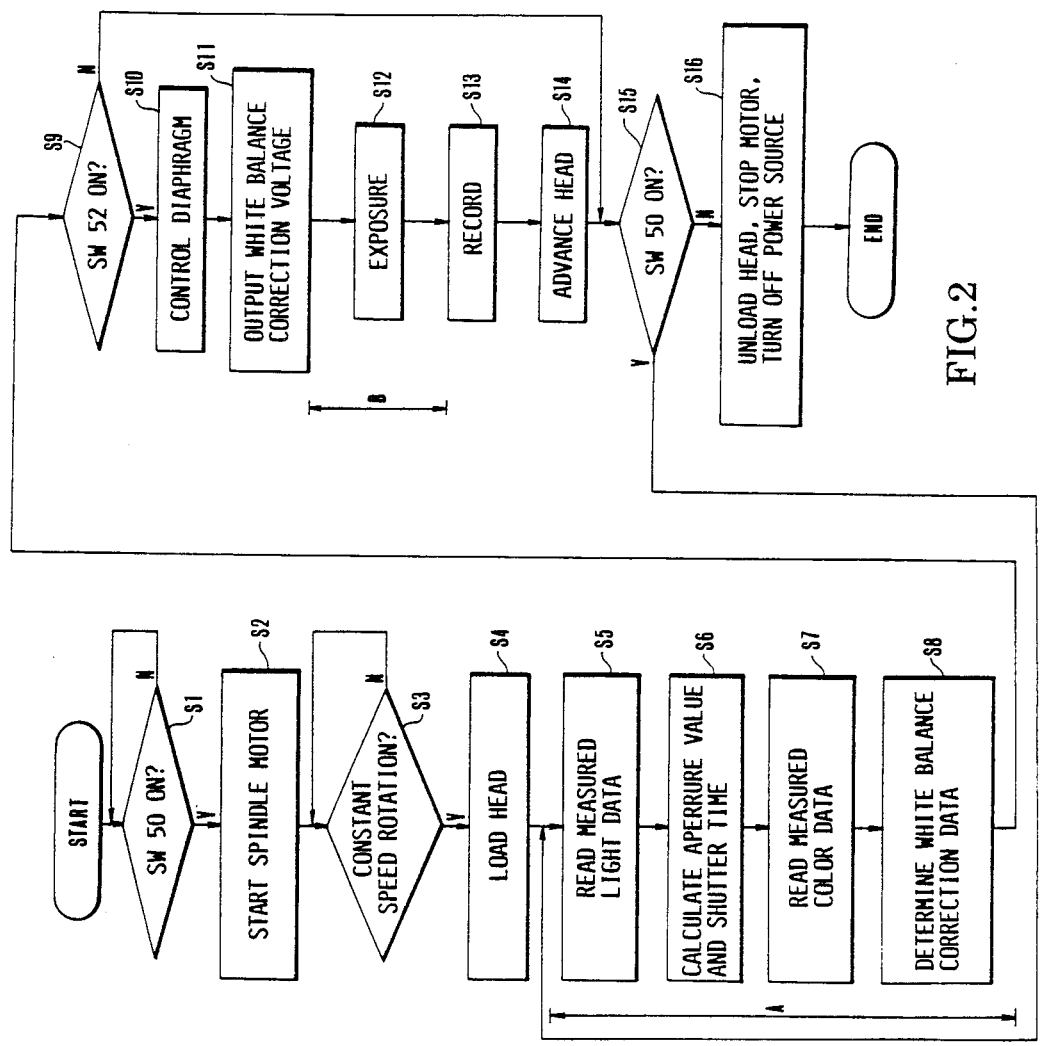
FIG. 2 is a flowchart for the operation with the flash device being not in use.

By reference to FIG. 2, the operation of the normal mode without using the flash device 10 is first described. When the release button is pushed to the first stroke, the switch 50 is closed (S1) to turn on an electric power source (not shown). The control circuit 48 then commands the motor control circuit 42 to start the spindle motor 40 (S2). Having detected that the floppy disk 34 rotates to a predetermined speed and the constant speed rotation becomes stable (S3), it commands the head control circuit 46 and the head drive mechanism 44 to move the magnetic head 32 to a predetermined track position and to load it on the surface of the floppy disk 34 (S4). Next, the object luminance from the light metering circuit 14 is read in (S5) and, according to a previously programmed line diagram, an aperture value and a value of shutter speed are determined (S6). Also from the colorimetric circuit 12, the color temperature of the illumination light on the object is read in (S7) and the amounts of correction of the gain for the R signal and the B signal to be used the signal processing circuit 26 are determined (S8). Until the switch 52 is turned on, that is, during the time when only the switch 50 is on, the above-described operation of metering and colorimetering the light and determining the amount of gain correction is repeated (S15).

When the switch 52 is turned on (S9), the size of aperture opening of the diaphragm 18 and the gains for the R and G signals of the signal processing circuit 26 are controlled (in S10 and S11 respectively) in accordance with the aforesaid values determined in the steps S5 to S8. And, the shutter device 22 is driven for the determined shutter time, thus making an exposure of the image sensor 24 (S12). The output of the image sensor 24 by this exposure operation is recorded on the floppy disk 34 (S13). At this time, the synchronizing signal generator circuit 38 responsive to the output (the PG pulses) of the PG coil 36 in synchronism with the rotation of the floppy disk 34 controls open timing of the shutter device 22, transfer timing of the image sensor 24, and others. When the recording operation on the floppy disk 34 has ended, the next cycle of shooting and recording must be prepared for. For this purpose, the magnetic head 32 is advanced to the next vacant track (S14) by the head control circuit 46 and the head drive mechanism 44.

When the switch 50 becomes off, the head 32 is unloaded, and the spindle motor 40 is stopped and the electrical power source is turned off (S16).

Figure 3:
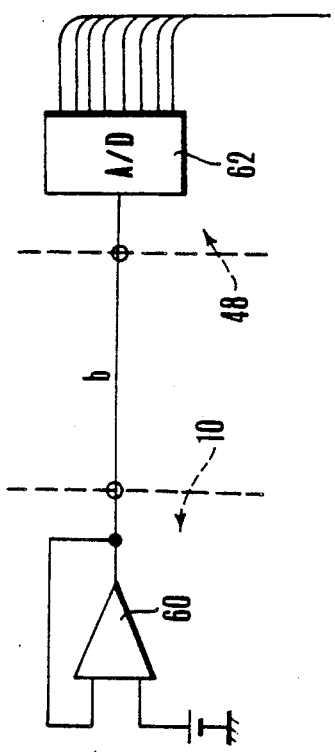
FIG. 3 and FIG. 4 are block diagrams of the construction of circuitry for the transfer of the inherent color temperature information from the flash device 10 to the control circuit 48 of FIG. 1.
Figure 4:
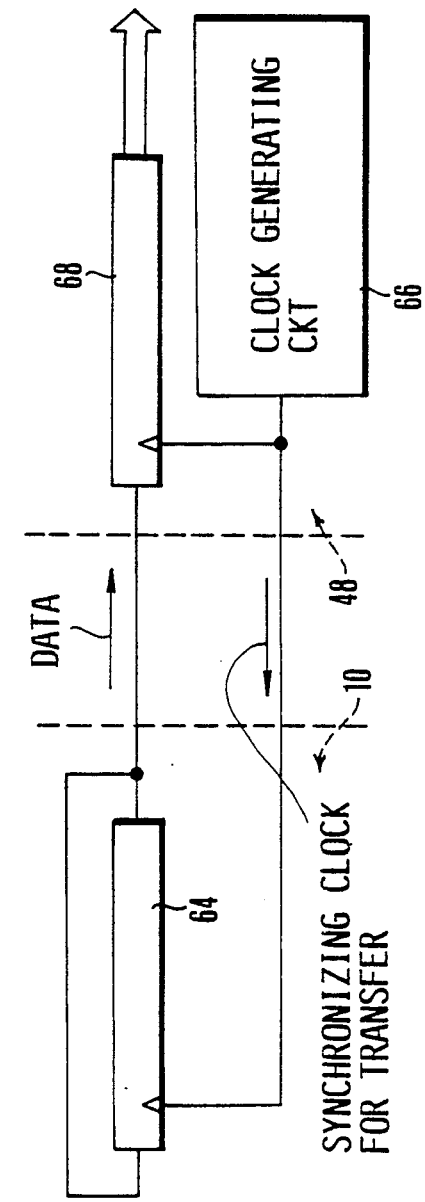

FIG. 3 and FIG. 4 in block diagrams show transfer circuits for transmitting the data of the characteristics of the flash device 10 to the control circuit 48. In FIG. 3, the flash device 10 contains a circuit 60 for producing an output representing the inherent color temperature, while the control circuit 48 contains a circuit 62 for reading in the color temperature of the flash light in the form of an A/D converter. As is understandable from this, the information of the color temperature inherent in the flash device 10 is outputted in analog form such as voltage, current, resistance, or frequency, while the control circuit 48 reads in the information as necessity arises. Also, in FIG. 4, the inherent color temperature information of the flash device 10 is stored in a shift register 64. When a clock generating circuit 66 in the control circuit 48 sends a shift clock, it is read in a shift register 68 in the control circuit 48.

Figure 5A:
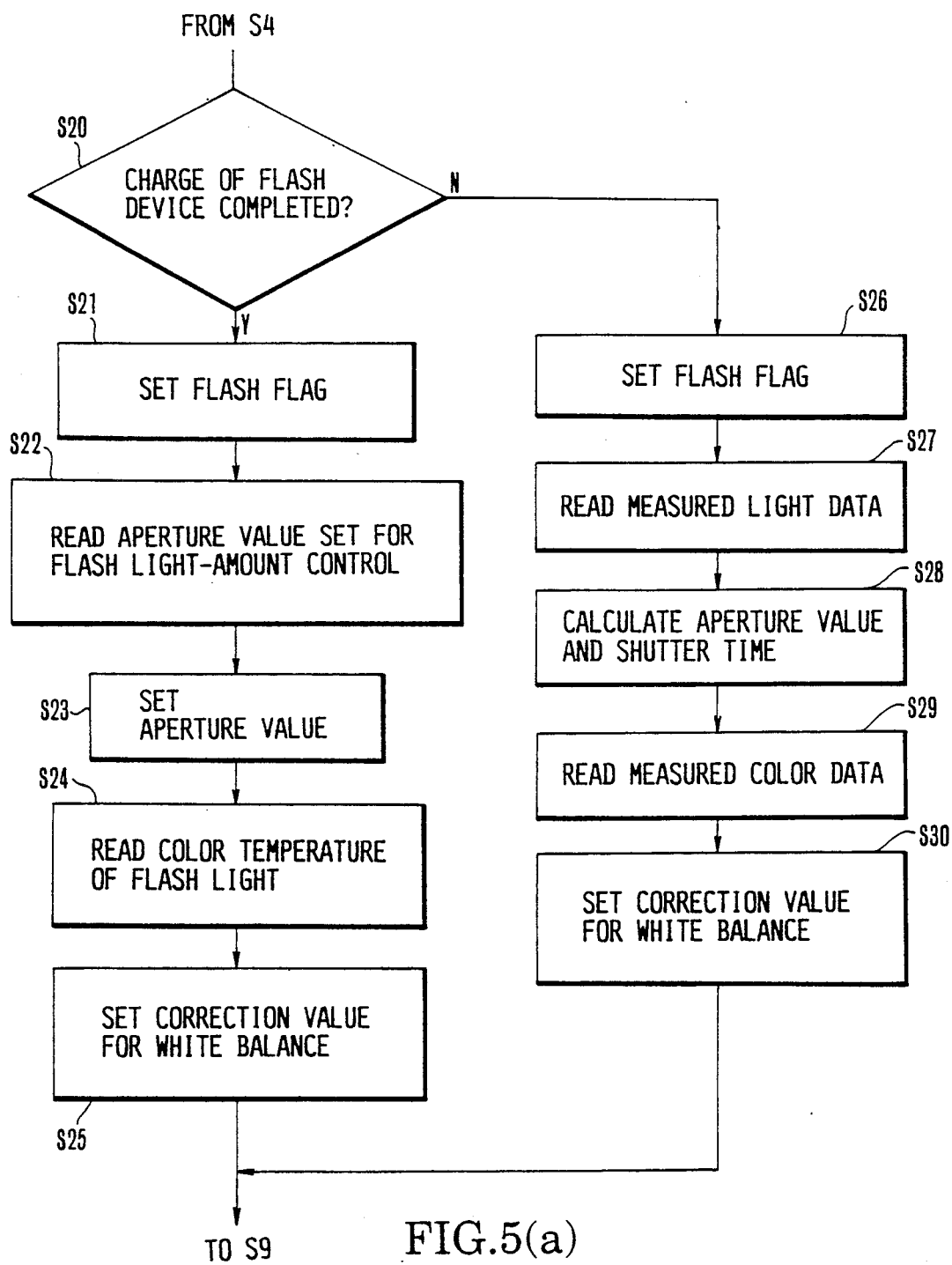
FIGS. 5(a) and 5(b) show the main parts of a flowchart for the operation with the flash device in use.
Figure 5B:
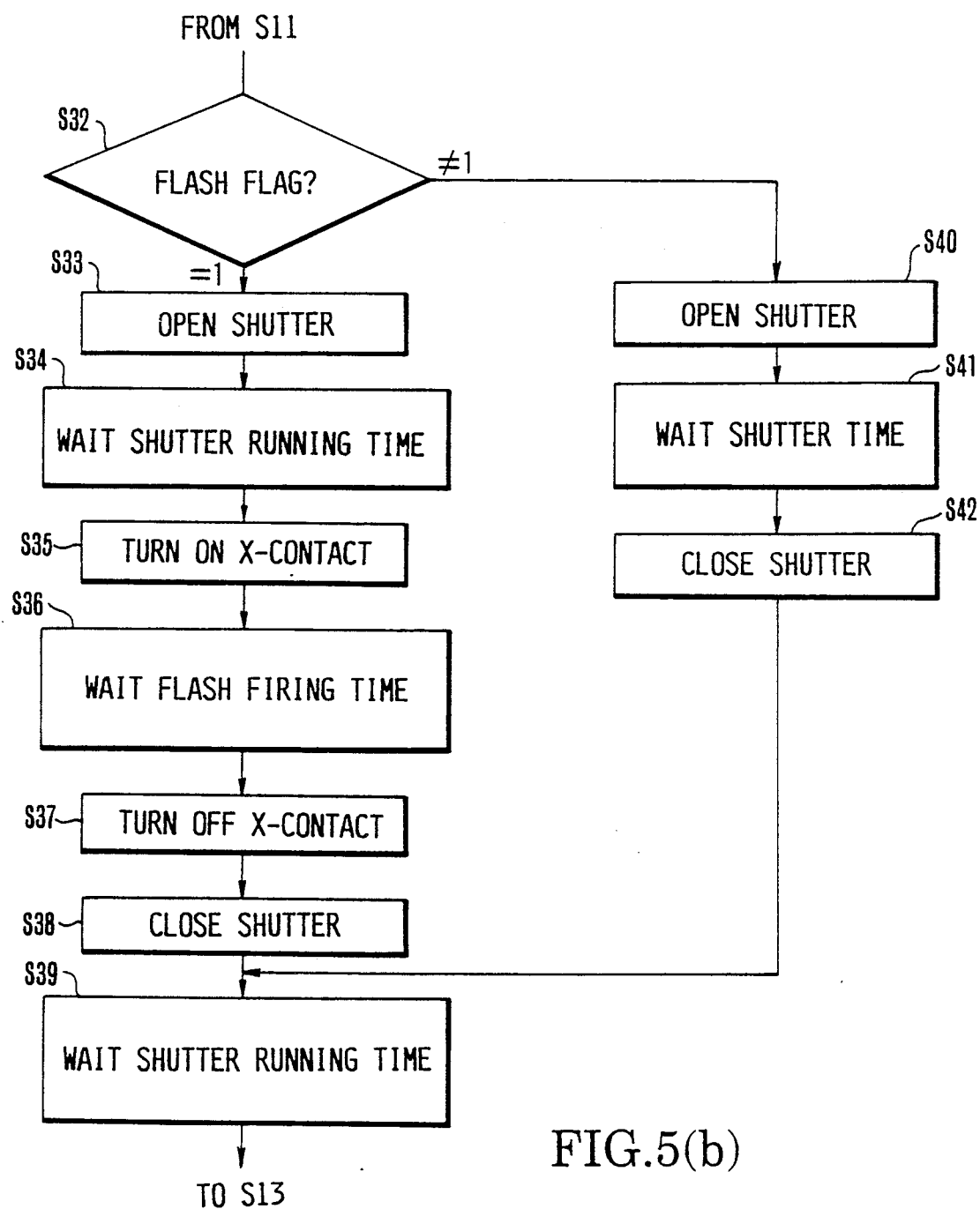

The operation with the use of the flash device 10 is described below. In this case, the process of FIG. 2 is altered in parts A and B as shown in FIGS. 5(a) and 5(b). That is, the flowchart of FIG. 5(a) is substituted for the process A, and the flowchart of FIG. 5(b) for the process B. In FIG. 5(a), the control circuit 48 examines a charge completion signal "a" from the flash device 10 (S20). If the charge is completed, the flash flag is set (S21), the set aperture value "c" to which the flash light is to be adjusted is read in from the flash device 10 (S22), the diaphragm 18 is set to that aperture value (S23), the inherent color temperature information "b" held by the flash device 10 is read in (S24), the gain correction value for the white balance of the signal processing circuit 26 is determined and applied to the signal processing circuit 26 (S25). Further, if the flash device 10 is not fully charged (S20), the control circuit 48 resets the flash flag (S26), reads in the measured light data "f" from the light metering circuit 14 (S27), calculates an aperture value and a shutter time value (S28), reads in the measured color temperature data "e" from the colorimetric circuit 12 (S29) and sets the amount of gain correction for the white balance (S30).

In the process for exposure of FIG. 5(b), if the flash flag is "1" (S32), the shutter device 22 is fully opened (S33, S34). When an X-contact turns on (S35), the flash device 10 is fired for a period of time (S36). At the termination of the period, the X-contact is turned off (S37), the shutter device 22 starts to close (S38), and then the full closure of the shutter device 22 is awaited. If the flash flag is "0", the shutter device 22 is opened for the preset time and closed (S40, S41, S42, S39).

In the above-described embodiment, the color temperature inherent in the flash light can be corrected. But, with another flash device as of the light-amount controllable type in which the firing period of time changes depending on the photographic conditions, wherein the color temperature depends on the firing period of time, the correction becomes impossible to perform. To correct the color temperature owing to the firing period of time, the white balance may be adjusted in such a manner that, instead of reading in the color temperature information from the flash device 10 in the process A of FIG. 2, after the emission of flash light has terminated at a time during the exposure, the information representing the corrected color temperature inherent in the flash light by the color temperature difference due to the firing period of time is read from the flash device 10 into the control circuit 48.

Figure 6:
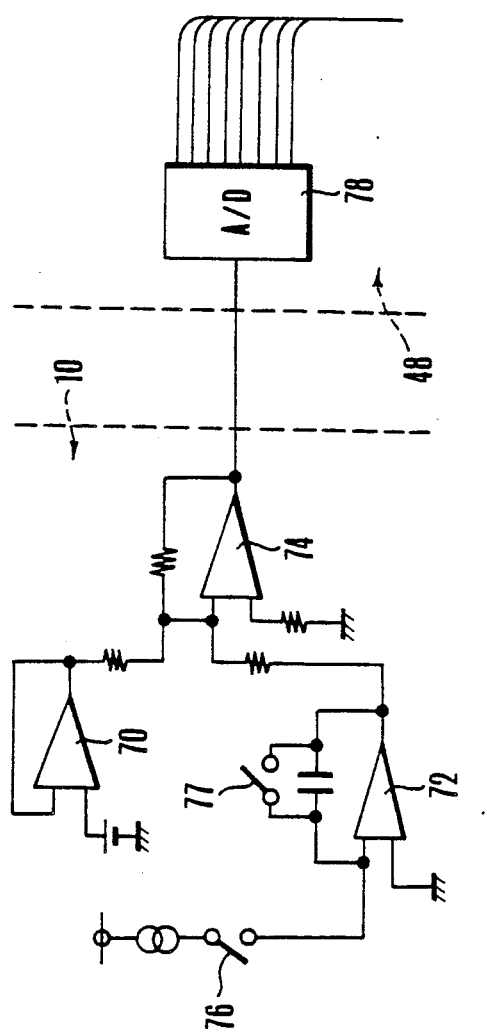
FIG. 6 and FIG. 7 are block diagrams of the construction of circuitry for the transfer of the information of the color temperature correction by the firing period of time when the used flash device is of the light-amount controllable type.
Figure 7:
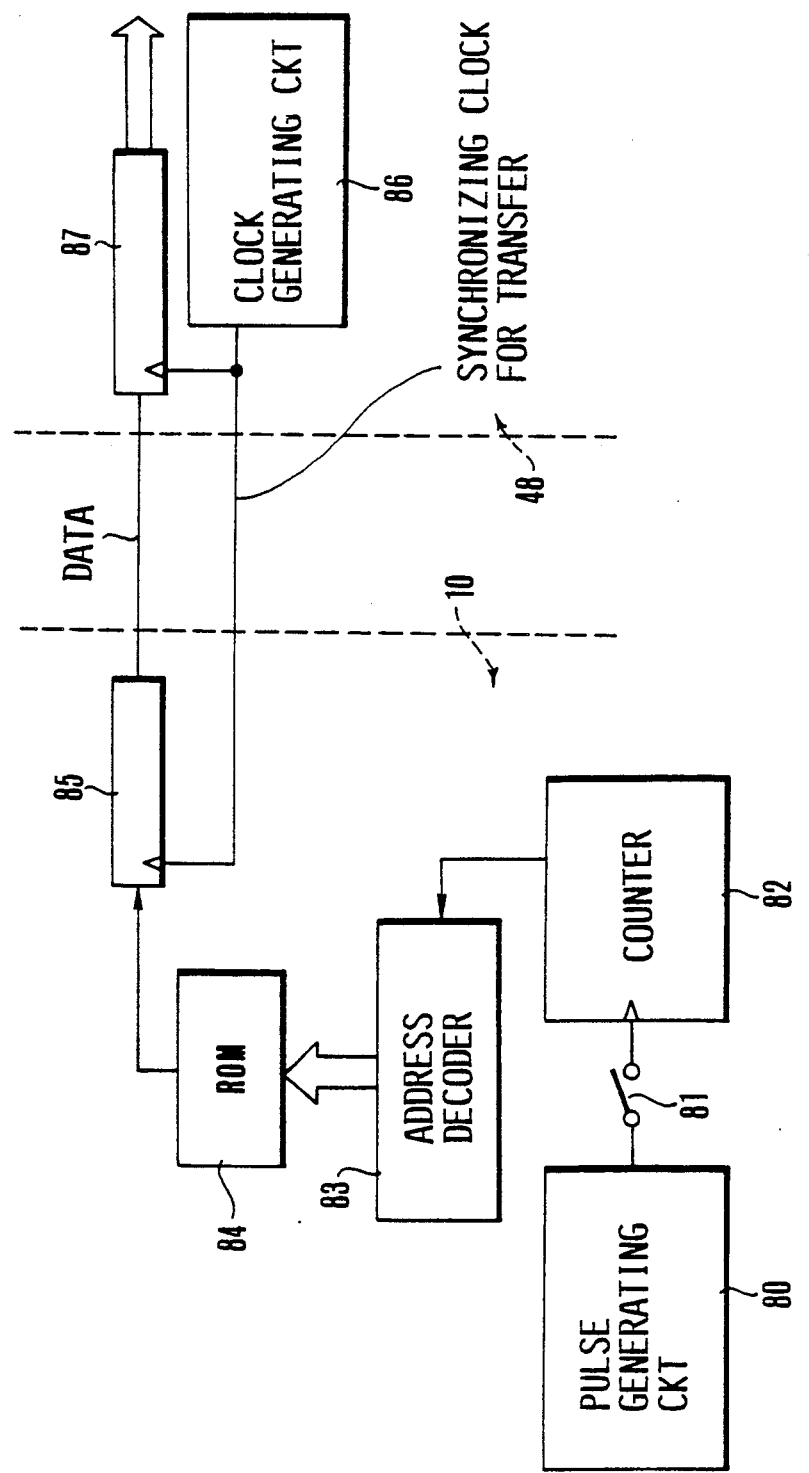

FIG. 6 and FIG. 7 in block diagrams show the construction of two examples of circuits for transferring the correction value of the color temperature by the firing period of time from the flash device 10 to the control circuit 48. The transfer circuitry of FIG. 6 operates with analog values, comprising a circuit 70 for generating a voltage representing the color temperature inherent in the flash device 10, an integration circuit 72, an adder 74 whose inputs are connected to the outputs of the voltage generating circuit 70 and the integration circuit 72, a switch 76 which closes when flash light starts to emit, and opens when the emitting stops, another switch 77 which opens when flash light starts to emit, and an A/D converter 78 similar to the A/D converter 62. The opening and closing of the switches 76 and 77 enable the output of the integration circuit 72 to become a voltage proportional to the firing period of time. Therefore, the output of the adder 74 has a voltage corresponding to the color temperature information of the flash light including the correction by the firing period of time. The control circuit 48 reads in this voltage by using the A/D converter 78. Incidentally, the switch 77 is left closed in proper timing (after the control circuit 48 has read in the color temperature information) until the next firing starts.

FIG. 7 shows an example of the transfer circuitry constructed in digital form. A pulse generating circuit 80 produces pulses with a constant interval. These pulses are applied to a counter 82 through a switch 82 which turns on at the start of firing, and off at the termination of the firing. An address decoder 83 uses the counted value of the counter 82 as the address when it accesses a ROM 84. In the ROM 84, there are previously stored the correction values of the color temperature as the function of the firing period of time at the addresses corresponding to the values of the firing period of time. The data read from the ROM 84, after the flash light stops from emitting, is transferred to a shift register 85. Responsive to the transfer clock from a clock generating circuit 86 of the control circuit 48, the shift register 85 then transfers the data to another shift register 87 in the control circuit 48. By this, the control circuit 48 can know the information of the corrected color temperature inherent in the flash light by the firing period of time. The arrangement of FIG. 7 has a merit that it is easily applicable even to the case that the variation of the color temperature with the firing period of time is not monotonous in respect to the firing period of time.

In such a manner, the white balance can be adjusted by taking into account the difference of the color temperature by the firing period of time. But a problem arises in that the correction of the inherent color temperature by the firing period of time must be calculated on the flash device 10 side and transferred to the camera side (control circuit 48) within a short time from the exposure of the image sensor 24 to the recording on the floppy disk 34 (the shorter the time from the exposure to the recording, the lesser the problem of the thermoelectric charge). Therefore, for the inherent color temperature of the flash device 10, the process may be altered as shown in FIG. 5(a) so that when setting a condition about the environment, it is read in the control circuit 48 to effect a preliminary setting and after the exposure, the correction value by the firing period of time is read in the control circuit 48 to amend the correction value of the white balance which has been preliminarily set before the exposure. The recording operation on the floppy disk 34 is carried out in synchronism with the PG pulses from the PG coil 36. Yet, because the exposure of the image sensor 24 is performed in arbitrary timing depending on the intention of the user, the time from the exposure to the recording is not constant. Therefore, in some cases of the timings from the exposure of the image sensor 24 to the recording on the floppy disk 34, that correction which occurs after the exposure may be omitted. In this case, the flowchart becomes identical to that of FIGS. 5(a) and 5(b).

Though, in the above-described embodiment, what is transmitted from the flash device 10 to the control circuit 48 has been the color temperature data inherent in the flash device 10, this may be modified in such a way that a value of the color temperature which is usable as the reference for any type of flash device over the electronic still camera system is set forth and the deviation from this reference value is transmitted from the individual flash device 10 to the camera side (control circuit 48). With this modification, the amount of data for the color temperature information to be transmitted can be reduced, and the old type flash device having no color temperature information output circuit can also be used. In this example of modification, at the step S25 of FIG. 5(a), the control circuit 48 sets the value of correction of the white balance preliminarily according to the reference color temperature held in the form of ROM. When an exposure is being made (critically speaking, after the termination of emission of the flash light), control circuit 48 then reads in the deviated value of the color temperature by the firing period of time of the used flash device to amend the correction value of the white balance which has previously been set as the preliminary one. It is also to be noted that at the time of reading in that deviated value, the computation with the reference value may be performed when the correction value of the white balance is set. But from the standpoint of shortening the time lag of the release, it is desirable to precedingly make the preliminary setting of the reference value.

The reading of the flash light color temperature information (whose items are the inherent color temperature, the correction value of the color temperature, the firing period of time, etc.) and the computation of a value of correction of the white balance which are to be performed when the image sensor 24 is being exposed may otherwise be performed when the shutter device 22 is running, provided the emission of the flash light is completed. If so, the time from the exposure to the recording can be shortened. Also, if the signal form of the color temperature information read from the flash device 10 into the control circuit 48 is made the same as the color temperature information from the colorimetric circuit 12, the processing in the control circuit 48 becomes simpler. Further, the reading circuit of the control circuit 48 side may be provided with a multiplexer at the input side thereof so that it also serves to read in the output of the colorimetric circuit 12. In this case, the switching of the multiplexer can be performed by using the charge completion signal.

Also, though, in the embodiment of the light-amount controllable type flash device, it has been on the flash device 10 side that the value of correction of the color temperature corresponding to the firing period of time is computed, what are transferred from the flash device to the control circuit 48 side may be limited to the color temperature information inherent in the flash light (or the deviated value from the reference value) and the firing time information themselves, while the computation of the correction by the firing period of time is performed in the control circuit 48. Also, the light-amount controlling operation may be performed either in the flash device or in the camera side (control circuit 48). In the case of the so-called TTL direct light-amount control where the light-amount controlling operation is performed with the light passing through the photographic optical system 16, the aperture value to be set and the firing period of time are determined on the camera side (control circuit 48). Therefore, the signal to be transmitted from the flash device to the camera side is simpler. That is, from the flash device to the camera side, only one time is enough to transmit the data of the color temperature inherent in the flash light (or the deviation from the reference value) and the information for correction for the firing period of time, for example, when the switch 50 turns on, or the flash device is attached.

For the arrangement assuming the use of the reference flash device, in a case where a flash device having no means for sending the data of the color temperature inherent in its flash light (the corrected color temperature data by the firing period of time) the fact that it has no sending means must be detected. For this purpose, in FIG. 3 and FIG. 6, use is made of a pull-up resistor on the input side of the A/D converter 62 or 78 and as the flash device has the aforesaid sending means, it is stipulated that this means does not produce a voltage corresponding to the full set of the A/D converter 62 or 78. If so, the occurrence of reading-in of the voltage corresponding to the full set of the A/D converter 62 or 78 tends to indicate that the input of the A/D converter 62 or 78 is open. Thus, the used flash device is judged to have no aforesaid sending means. In FIG. 4 and FIG. 7, the input of the shift register 64 or 85 is pulled up or down and the shift register 64 or 85 is specified so that the data of all "1" or all "0" is not produced. By this, whether or not the used flash device has the aforesaid sending means can be discriminated.

As is easily understandable from the foregoing explanation, according to the invention, the accuracy of the white balance at the time of using the flash device can be improved.

Figure 8:
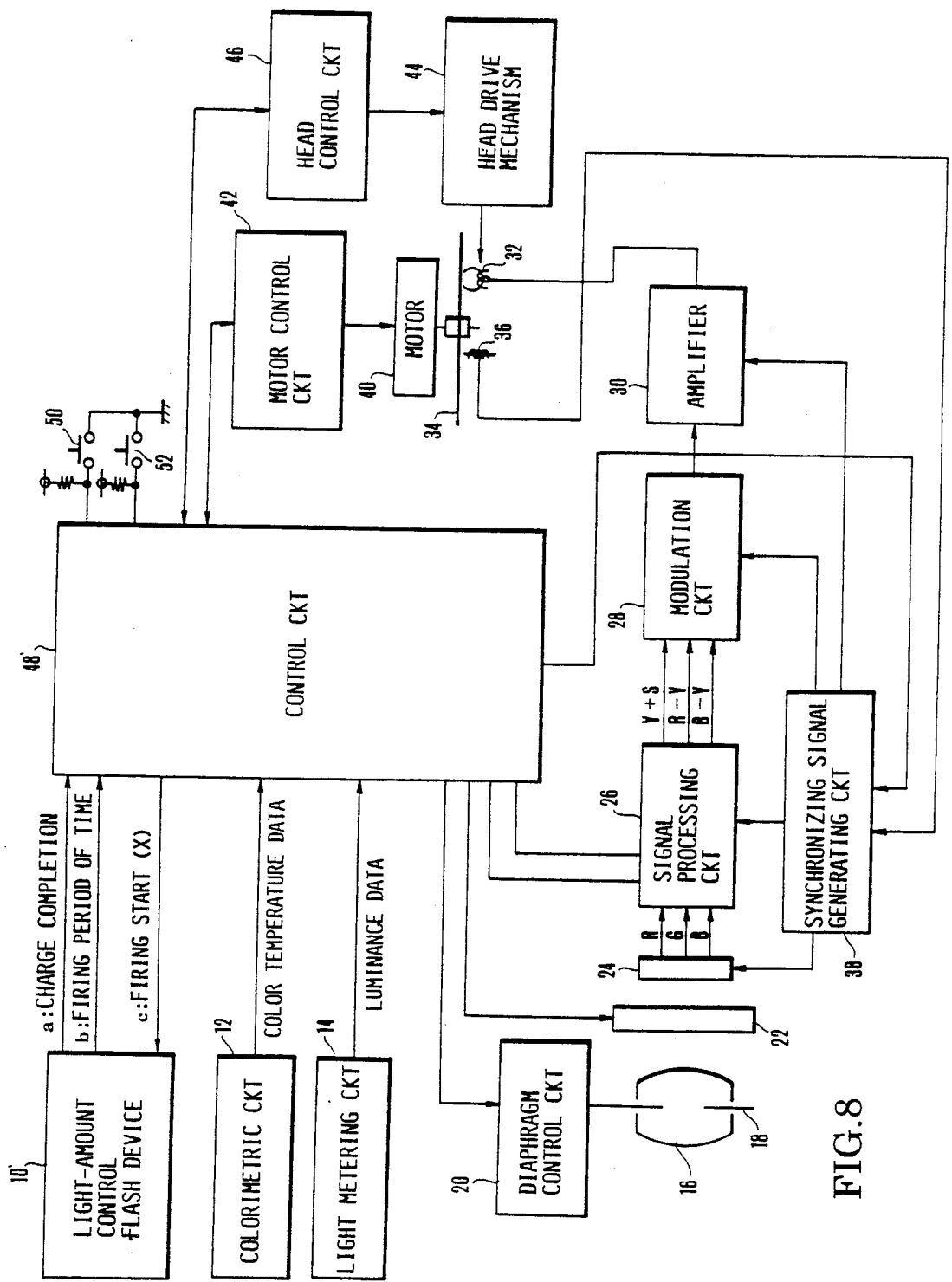
FIG. 8 is a block diagram of the construction of a second embodiment of the invention.
Figure 9:
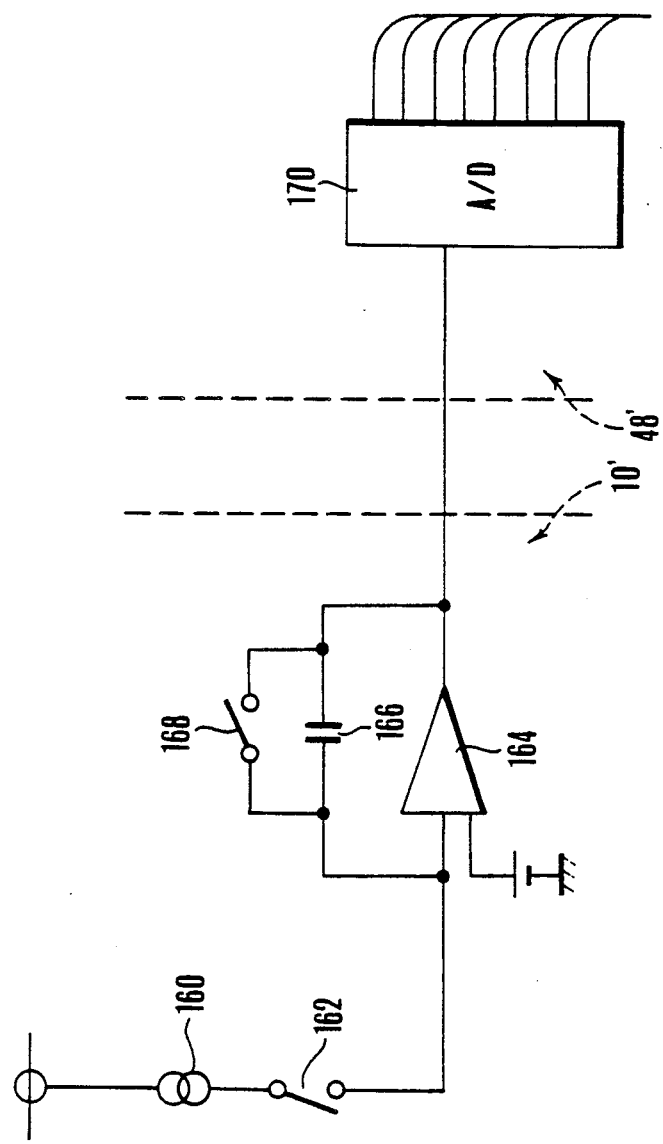
FIG. 9 and FIG. 10 are block diagrams of the construction of circuitry for the transfer of the information of the firing period of time from the flash device 10' to the control circuit 48' of FIG. 8.
Figure 10:
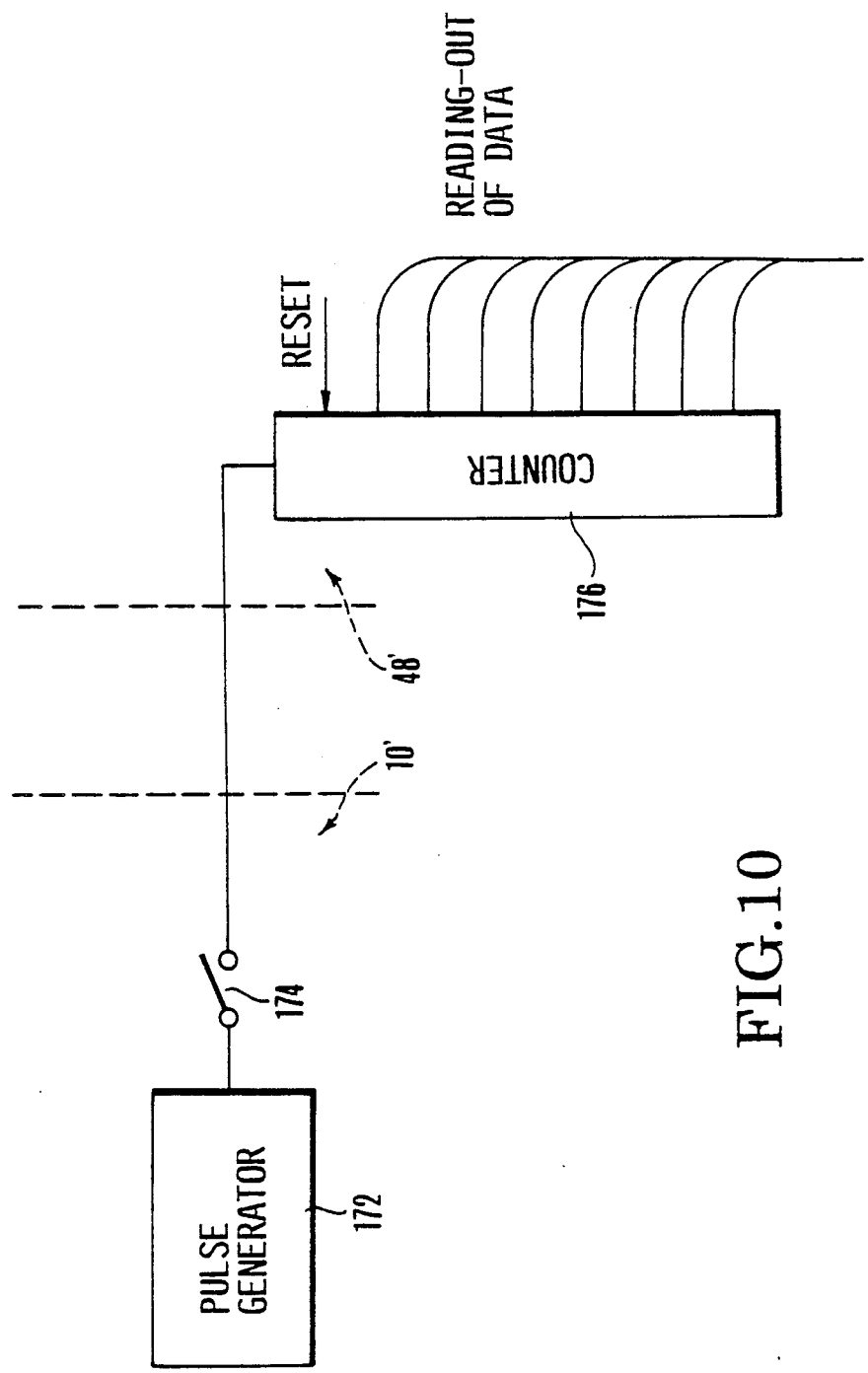

Next, FIG. 8 shows a second embodiment of the invention which is different from the arrangement shown in FIG. 1 in the content of information to be transmitted between a light-amount controllable type flash device 10' and a control circuit 48'. The construction of a signal transmission between the flash device 10' and the control circuit 48' is briefly described below. As the charge completion signal, the voltage on a main capacitor, when fully charged, of the flash device 10' (or its divided voltage) is compared with a predetermined voltage and its comparison result is transmitted through a charge completion signal line "a" to the control circuit 48'. Also, a firing start signal (x) may be the known one as obtained from, for example, the X-contact of the focal plane type camera. As for a firing stop signal, in the case of controlling the stoppage in the camera side at the control circuit 48', and in a case where the control circuit 48' desires to know the accurate firing period of time in the flash device 10', such an arrangement as in FIG. 9 or FIG. 10 is used for transmitting the firing time information from the flash device 10' to the control circuit 48'. The control circuit 48' determines a value of correction of the white balance from the firing time information by, for example, the table reference method and applies it to the signal processing circuit 26.

FIG. 9 shows the construction and arrangement of the parts of transfer circuitry for the firing time information in analog form. The flash device 10' includes a constant current source 160, a switch 162 which is closed when the firing starts, and opens when the firing stops, an operational amplifier 164, a capacitor 166, a normally-open switch 168 which is closed either after the control circuit 48' has read the firing time information, or when, or just before, the firing starts, and an A/D converter 170 receptive of the output of the operational amplifier 164 for producing an output in digital form. The operational amplifier 164 and the capacitor 166 constitute an integration circuit. As the switch 162 closes and opens, the output of the operational amplifier 164 represents a voltage value proportional to the firing period of time. This is taken in the control circuit 48' by the A/D converter 170. The closing of the switch 168 may be controlled either from the control circuit 48' or on the flash device 10' side.

FIG. 10 shows an example of transfer circuitry for the firing time information in digital form, comprising a pulse generator 172 for producing pulses in sufficiently shorter constant intervals than the firing period of time, a switch 174 which is closed when the firing starts and which is opened when the firing stops, and a counter 176 for counting the number of pulses passing through the switch 174. By this construction and arrangement, at the time of stopping the firing and after this, the number of pulses corresponding to the firing period of time is stored in the counter 176. Therefore, by reading this out, the control circuit 48' can know how long the firing period of time is. Incidentally, the counter 176 may be reset at an appropriate time before the next firing starts.

Figure 11A:
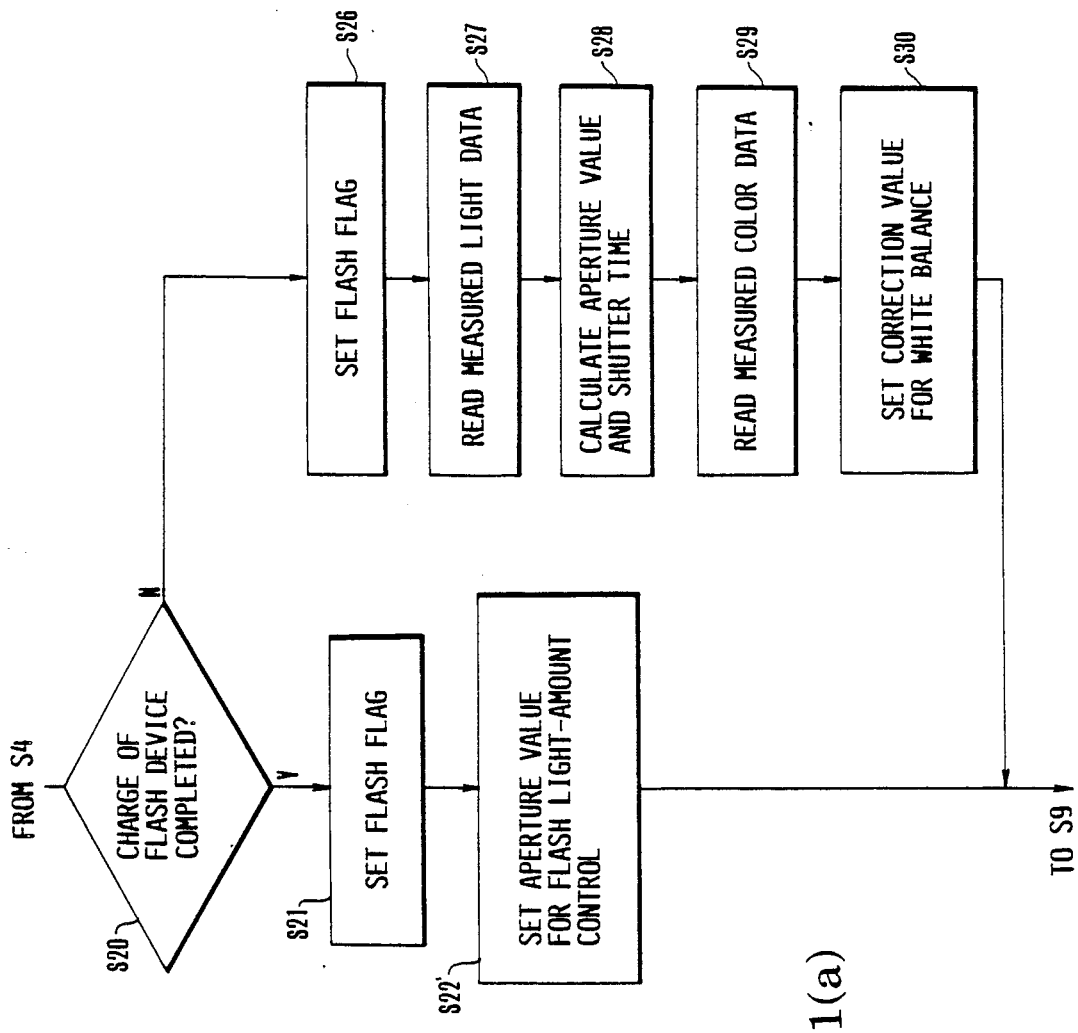
FIGS. 11(a) and 11(b) show the main parts of a flowchart for the operation with the flash device in use.
Figure 11B:
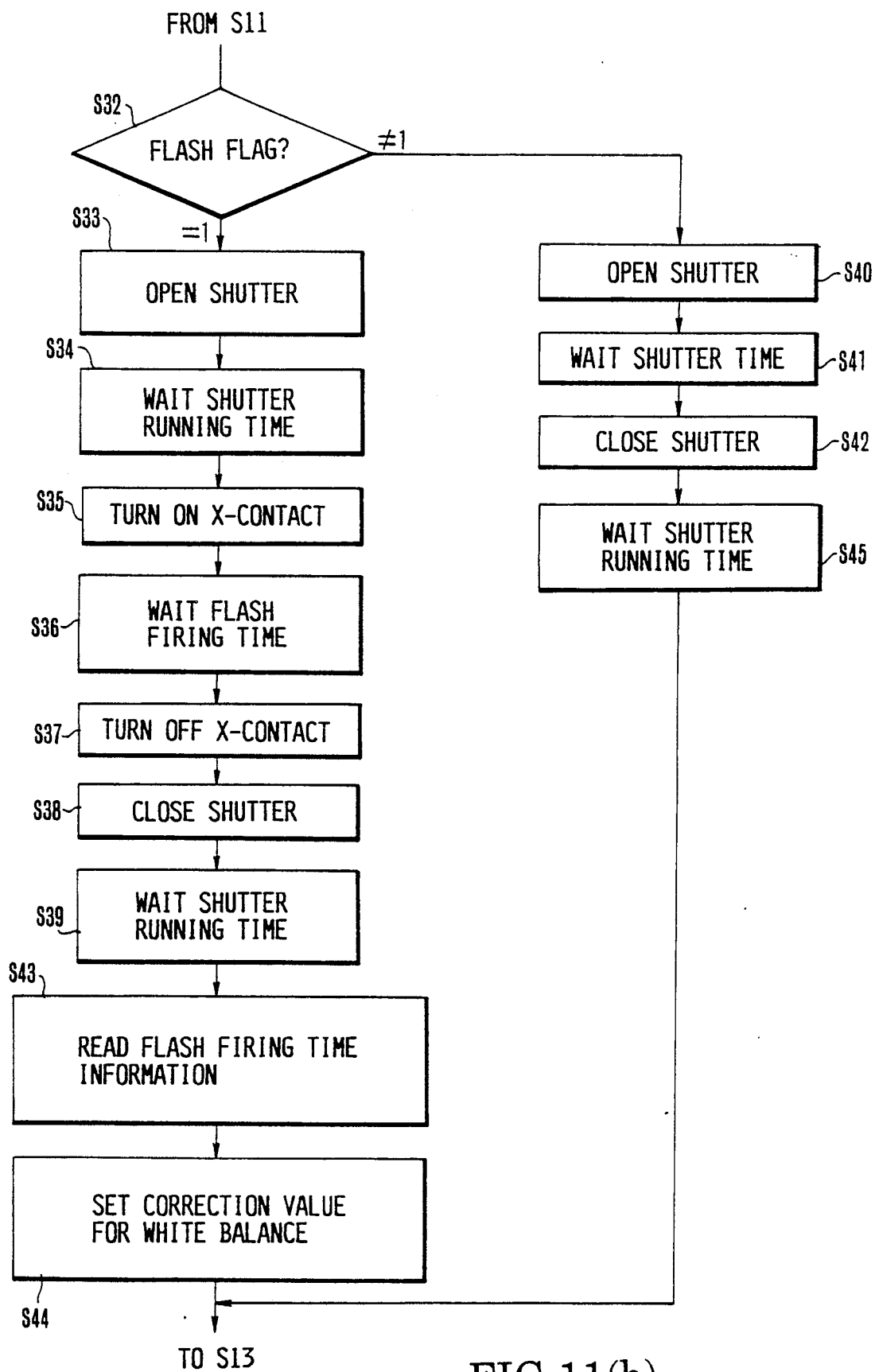

The operation of the system with the use of the flash device 10' of FIG. 8 is described below. In this case, the portions A and B of the process of FIG. 2 are altered as shown in FIGS. 11(a) and 11(b). That is, the flowchart of FIG. 11(a) is substituted for the portion A of the flowchart of FIG. 2, and the flowchart of FIG. 11(b) for the portion B. In FIG. 11(a), the control circuit 48' examines the charge completion signal "a" from the flash device 10' (S20), and, if the charge is completed, sets the flash flag (S21), and adjusts the diaphragm 18 to the aperture value (S22'), in accordance with which the amount of flash light is controlled. Also, if the flash device 10' is not fully charged (S20), the flash flag is reset (S26), then the measured light data is read in from the light metering circuit 14 (S27), then an aperture value and a shutter time value are computed (S28), then the colorimetric data is read in from the colorimetric circuit 12, and then the value of gain correction for the white balance is set (S30).

In the exposure process of FIG. 11(b), if the flash flag is "1" (S32), full opening of the shutter device 22 is awaited (S33, S34), then the X-contact is closed (S35), then a firing equivalent time of the flash device 10' is awaited (S36) before the X-contact opens (S37), then the shutter device 22 starts to close (S38), then full closure of the shutter device is awaited (S39), then the flash firing time information is read in from the flash device 10' (S43), and then the correction value of the white balance in the signal processing circuit 26 is set (S44). If the flash flag is "0", the shutter device 22 is opened for a previously set time (S40, S41, S42, S45).

The above-described embodiment may be modified in such a way that the white balance which is to be corrected when a flash exposure is made is preliminarily set to its reference value (for example, a correction value corresponding to a color temperature value within the range of variation of the color temperature with the firing period of time from the longest to the shortest value or at a point in the neighborhood thereof) and after the image sensor 24 has been exposed, the preliminarily set value is slightly amended depending on the actual firing period of time. Such an amending operation is usually in a small degree, therefore giving an advantage that it does not take much time. Particularly in application to the case where a pulse width modulation type D/A converter and an integrator are used for generating the control voltage for the white balance adjustment, this period of time cannot be ignored. As to the flowchart, after the step S22' of FIG. 11(a), the preliminary setting of the correction value of the white balance is performed, while in FIG. 11(b), the preliminary setting of the correction value of the white balance is amended on the basis of the flash light firing time information read in the step S43.

Though the foregoing has been described taking an example of the light-amount controllable flash device, it is to be understood that the invention is applicable to the so-called TTL direct light-amount controllable type of flash device where the firing of the flash device is controlled by utilizing the amount of light passing through the photographic optical system. Also, as the arrangement of obtaining the correction value of the white balance from the firing time information, besides the table reference method, in application to the case where the flash device has its flash light monotonously vary in color temperature with the firing period of time, an approximate measure may be taken such that the firing time information is multiplied by a proper coefficient, and the result is added to or subtracted from the correction value of the white balance.

What is claimed is:

1. An image sensing apparatus comprising:
   (a) image sensing means for forming a color video signal;
   (b) illuminating means for illuminating an object to be photographed, said illuminating means being detachable from the image sensing apparatus;
   (c) transfer means for transferring an information concerning a color temperature of the illuminating means from the illuminating means; and
   (d) correcting means for correcting the white balance of the color video signal output from said image sensing means in accordance with said information concerning color temperature and an illuminating period of time of said illuminating means.

2. An apparatus according to claim 1, further comprising illuminating time control means for controlling the illuminating period of time of said illuminating means.

3. An apparatus according to claim 2, wherein said illuminating time control means includes light metering means for producing a signal corresponding to a luminance of the object.

4. An apparatus according to claim 1, wherein said illuminating means includes a flash illuminating element.

5. An apparatus according to claim 4, wherein said illuminating element includes a strobe.

6. An apparatus according to claim 1, further comprising color characteristic data generating means for generating color characteristic data of said illuminating means.

7. An apparatus according to claim 6, wherein said color characteristic data generating means generates analog data.

8. An apparatus according to claim 6, wherein said color characteristic generating means generates digital data.

9. An apparatus according to claim 6, wherein said color characteristic data generating means is a component of said illuminating means.

10. An apparatus according to claim 6, wherein said color characteristic data generating means is a component of said image sensing apparatus.

11. An image sensing apparatus comprising:
    (a) image sensing means for forming a color video signal;
    (b) detecting means for detecting an illuminating period of time of detachable illuminating means for illuminating an object to be photographed;
    (c) transfer means for transferring an information concerning a color temperature of the illuminating means from the illuminating means; and
    (d) correcting means for correcting the white balance of the video signal in accordance with the information concerning color temperature and the illuminating period of time detected by said detecting means.

12. An apparatus according to claim 11, further comprising illuminating means detachably attached to said image sensing apparatus.

13. An apparatus according to claim 12, further comprising illuminating time control means for controlling the illuminating period of time of said illuminating means.

14. An apparatus according to claim 13, wherein said illuminating time control means includes light metering means for producing a signal corresponding to a luminance of the object.

15. An apparatus according to claim 12, wherein said illuminating means includes a flash illuminating element.

16. An apparatus according to claim 15, wherein said illuminating element includes a strobe.

17. An apparatus according to claim 12, further comprising color characteristic data generating means for generating color characteristic data of said illuminating means.

18. An apparatus according to claim 17, wherein said color characteristic data generating means generates analog data.

19. An apparatus according to claim 17, wherein said color characteristic generating means generates digital data.

20. An apparatus according to claim 17, wherein said color characteristic data generating means is a component of said illuminating means.

21. An apparatus according to claim 17, wherein said color characteristic data generating means is a component of said image sensing apparatus.

22. An apparatus according to claim 11, wherein said detecting means includes an A/D converter.

23. An image sensing apparatus comprising:
    (a) image sensing means for forming a color video signal;
    (b) illuminating means for illuminating an object to be photographed, said illuminating means being detachable from the image sensing apparatus;
    (c) transfer means for transferring an information concerning a color temperature of the illuminating means from the illuminating means; and
    (d) correcting means for correcting the white balance of the color video signal output from said image sensing means in accordance with said information concerning color temperature.

24. An apparatus according to claim 23, wherein said illuminating means includes a flash illuminating element.

25. An apparatus according to claim 24, wherein said illuminating element includes a strobe.

26. An apparatus according to claim 23, further comprising color characteristic data generating means for generating color characteristic data of said illuminating means.

27. An apparatus according to claim 26, wherein said color characteristic data generating means generates analog data.

28. An apparatus according to claim 26, wherein said color characteristic generating means generates digital data.

29. An apparatus according to claim 23, wherein said color characteristic data generating means is a component of said illuminating means.

30. An apparatus according to claim 23, wherein said color characteristic data generating means is a component of said image sensing apparatus.

* * * * *